Inventors
WALTER J. HIRSCHBERG
JEHUDA OVADIA

July 29, 1952  W. J. HIRSCHBERG ET AL  2,605,463
TOPOGRAPHIC PRESENTATION RADAR

Filed Oct. 4, 1946  2 SHEETS—SHEET 2

Inventors
WALTER J. HIRSCHBERG
JEHUDA OVADIA

Patented July 29, 1952

2,605,463

UNITED STATES PATENT OFFICE 2,605,463

TOPOGRAPHIC PRESENTATION RADAR

Walter J. Hirschberg, Los Angeles, Calif., and
Jehuda Ovadia, New York, N. Y.

Application October 4, 1946, Serial No. 701,144

5 Claims. (Cl. 343—11)

(Granted under the act of March 3, 1883, as
amended April 30, 1928; 370 O. G. 757)

This invention relates to improvements in radar devices for land mapping or the like.

The purpose of this invention is to provide an aircraft with a radar device having a downwardly directed parabolic antenna producing a sharp beam for scanning the ground underneath at right angles to the motion of the plane. As the plane moves forward, a complete strip of land is covered. The received echoes are made to appear on a scope screen in the corresponding position to that on the ground with an intensity inversely proportional to the distance of the reflecting surface to the plane. This yields a relief map on the scope screen very much comparable to a topographic map. The persistency of the screen will hold the picture long enough for the plane to cover sufficient territory.

An important object of this invention is to provide a radar device having its screen presentation show received echoes on the screen in a position corresponding to the location of the targets on the ground.

A further object of this invention is to provide a radar device having its screen presentation show received echoes on the screen with an intensity inversely proportional to the distance of the reflecting surface to the plane.

Further objects and advantages will become apparent during the course of the following description, when taken in conjunction with the drawings, in which Fig. 1 is a block diagram of the circuits of the radar device;

Figure 1:
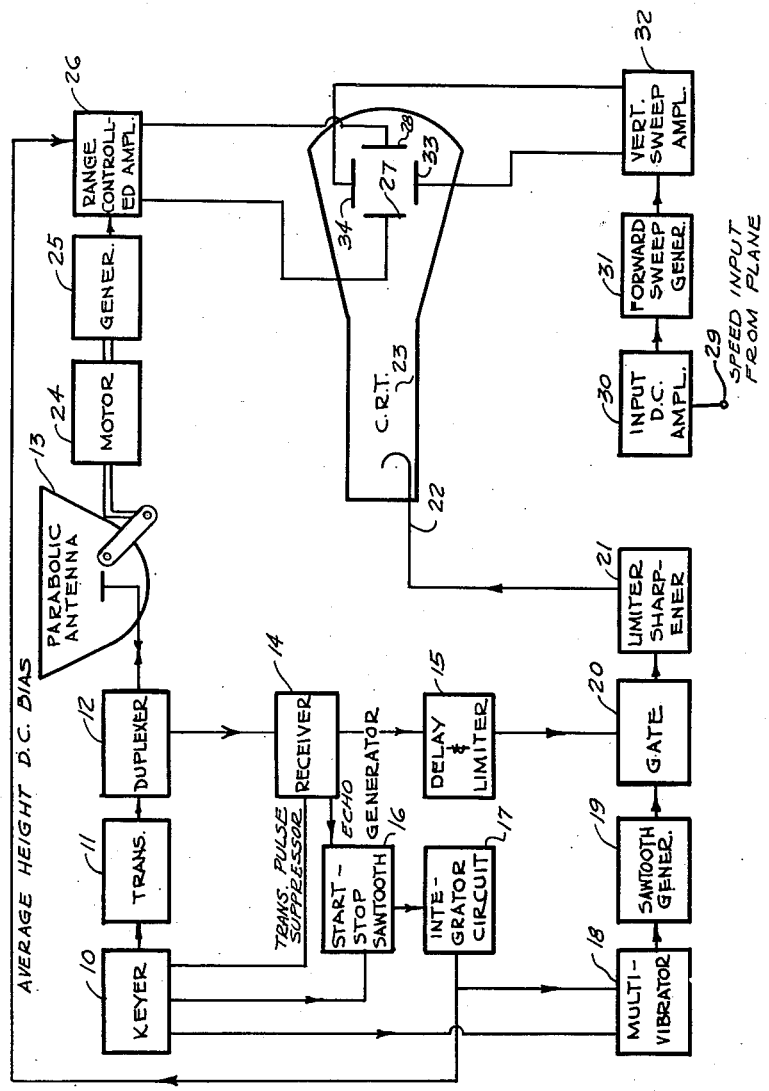

Referring to the drawings, Fig. 1 is a block diagram of the functional circuits with the keyer circuit 10 the basis for timing of all components. As in conventional radar systems, keyer 10, transmitter 11, duplexer 12, and the conventional radar antenna 13, comprise the outgoing energy stages, whereas antenna 13, duplexer 12 and receiver 14 comprise the incoming energy stages. The output of the receiver contains only the echo pulse as the transmitter pulse is suppressed in a conventional manner, said echo pulse, of course, being delayed in time with respect to the transmitter pulse a period proportional to the altitude of the plane above the ground.

The receiver 14 feeds two circuits, namely a delay limiter 15 and a start-stop sawtooth generator 16. Delay limiter 15 is a conventional limiter such as, for example, a vacuum tube operated with very low plate voltage and thus saturating at very low grid signal from receiver 14. Start-stop sawtooth generator 16 is a so-called "flip-flop" circuit consisting of two tubes which are alternately conducting, the switch-over being triggered by the transmitter (or keyer) and receiver pulses, respectively. Thus a train of sawtooth waves is obtained, one per keyer pulse, the amplitude of each such wave being dependent on the time interval between the transmitter pulse and the corresponding received pulse.

The output of generator 16 is fed into integrator circuit 17 which is essentially a condenser-resistor combination common to many circuits, the output of circuit 17 being the D. C. average value of the sawtooth. The output of circuit 17 is fed into a range delay multivibrator 18 and thence to a contrast sawtooth generator 19. The contrast sawtooth is a sharp-rising waveform of very short duration and is started by the trailing edge of the multivibrator square wave output (see curves 45 and 46 in Fig. 2).

The contrast sawtooth generator output and the delay-limiter output are combined in gate 20 and thence to limiter-sharpener 21. Gate 20 and limiter-sharpener 21 may be a tube having a high negative grid bias (see effective cutoff in curve 48 of Fig. 2) so that only the peaks of the combined signals, that is the contrast sawtooth signal and the delayed echo signal, have effect upon the output of the tube. Obviously, if the echo signal were not delayed, the tube would not respond to echo signals of sufficiently small amplitude so that the combined amplitude of the echo signal and the contrast sawtooth at that time was less than the effective cutoff. The output of the tube is fed to cathode 22 of cathode ray tube 23.

The azimuth-sweep-circuit consists of a range control amplifier 26 whose input includes a voltage from alternating current generator 25 driven by the antenna motor 24 plus a direct current bias from the integrator circuit 17. The output of the range control amplifier 26 is fed into the horizontal deflector plates 27 and 28 of the cathode-ray tube 23. Amplifier 26 is the conventional horizontal sweep amplifier except that its gain is controlled by the D. C. voltage from circuit 17. This D. C. voltage, or this "average height D. C. bias" as explained below, serves to adjust the sweep amplitude in such a way as to keep the distance on the ground that is represented by the width of the picture constant, while the plane changes its altitude.

The vertical sweep system includes a direct current amplifier 30 whose input voltage, applied to terminal 29 is proportional to the plane speed, and whose output voltage controls the rate of rise of the signal from a sawtooth generator 31 followed by a sawtooth amplifier 32 which is connected with the vertical plates 33 and 34 of the cathode-ray tube 23. In this manner, the vertical deflection on the screen of tube 23 follows the forward movement of the plane over the terrain being scanned.

The operation of the system of this invention will now be explained with reference to Fig. 2 of the drawings.

In operation, the keyer 10, whose waveform is illustrated at 40, triggers the transmitter 11, whose output pulse waveform 41 travels through the duplexer 12 to the antenna 13. The return signal enters the antenna 13, passes through the duplexer 12 to the receiver 14, whose input is represented at 42, where the transmitter pulse is suppressed as shown in waveform 43. Thus only the echo is present at the receiver output. As the start-stop sawtooth generator 16 is started by the transmitter, or keyer, and stopped by the received echo pulse its positive half-cycle, as indicated at 44, will have a duration $h$ where $h$ is the instantaneous distance of the plane measured in time, i. e. time of received echo signal ($t=0$ at time of transmitted pulse).

The sawtooth generator output is fed to integrator circuit 17 and the charge Q on the condenser of said circuit is $$Q=\frac{Svhdt}{Sdt}=V\frac{Shdt}{Sdt}=VH=CV_o$$

where H=average height of the plane above the terrain measured in microseconds.

Hence the charge of the condenser and therefore the voltage across it ($V_o$) is proportional to the average height H.

$$V_o=K_1H$$

where $V_o$ is now called the average height D. C. bias.

This D. C. bias controls the duration of the cycle of the multivibrator 18, whose waveform is designated 45, and the time duration of the positive half of said cycle may be written as $$X_0=K_2{}^1V_o=K_2H$$

Figure 2:
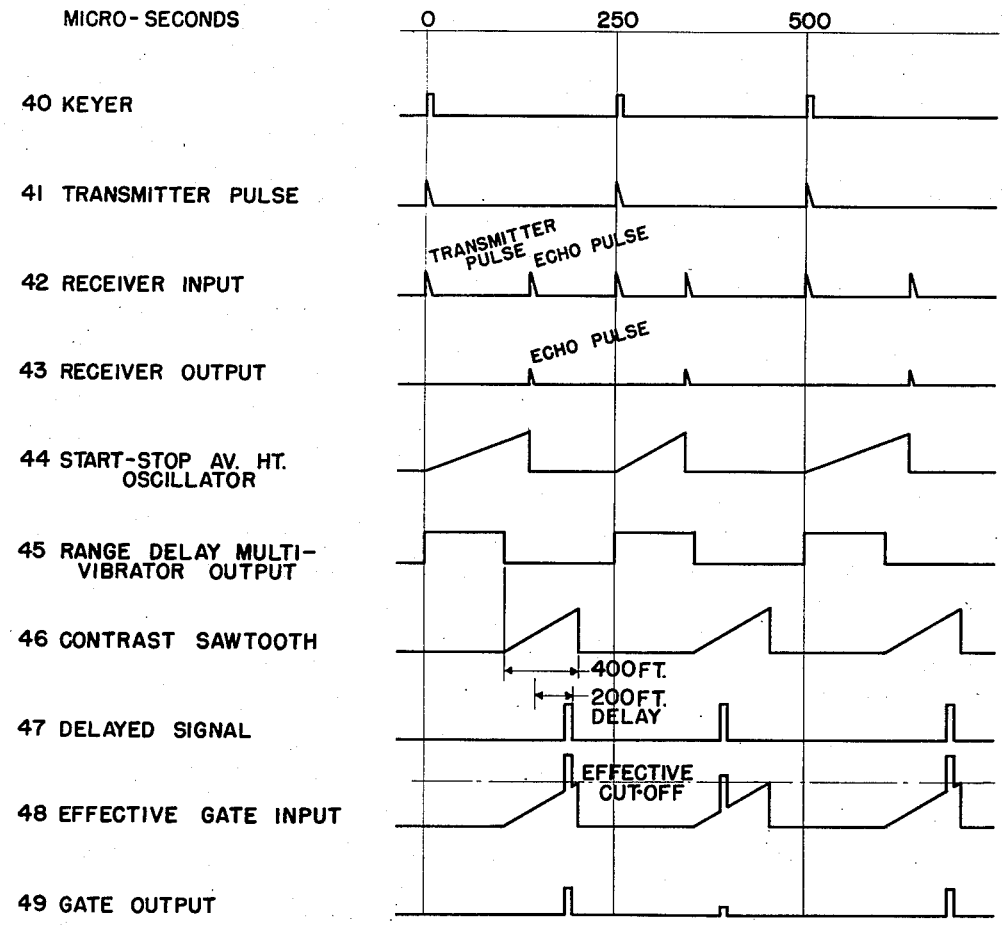
Fig. 2 is a group of waveforms occurring at various points in the circuits of the device, and the correct timed and spaced relations thereof.

The contrast sawtooth generator 19, whose waveform is designated 46, is triggered by the trailing edge of the multivibrator output, and the output of generator 19 has the equation $$y=\frac{h-x_0}{\Delta H}K_3$$

where $K_3$=maximum height of sawtooth 46, or the overall brilliancy range, and $\Delta H$=the width of sawtooth 46, or the depth range (range between black and brilliant on scope), which may be 400 ft., as indicated in Fig. 2, measured in microseconds.

Superposition of the delayed echo signal 47, which has a constant amplitude S due to the limiter action of element 15, on sawtooth 46 results in a wave 48 whose peak amplitude is $$ym=S+\frac{h-X_0}{\Delta H}K_3$$

and the voltage imposed on cathode 22, that is the voltage above the effective cutoff of gate 20 and limiter 21, is $$e=S+\frac{h-X_0}{\Delta H}K_3-K_3$$

Thus, by differentiation, the percentage change in brilliancy on the screen ($de$), compared to its overall brilliancy range ($k_3$) is equal to the percentage change in height ($dh$), compared to its total range $\Delta H$, or $$\frac{de}{K_3}=\frac{dh}{\Delta H}$$

It is thus seen that by means of contrast sawtooth generator 19, echoes 43 returning at different times, that is from points on the terrain at different heights and therefore different distances from the aircraft, will be superposed at different points on contrast sawtooth 46 and will form gate inputs 48 whose peak values will differ in amplitude. Accordingly, gate output 49 will be signals of different amplitude, the signals due to deep valleys being greater than that due to level terrain. By applying output 49 to cathode 22 of tube 23 to control the intensity of the presentation on the screen of tube 23, it is apparent that signals due to deep valleys will lower the grid to cathode voltage of tube 23 thereby causing the spot on the screen of tube 23 to be dark, while signals from high points on the terrain will increase the grid to cathode voltage resulting in light spots.

In order that the average height echo, which controls the width of output signal 45 from multivibrator 18 and therefore the starting point of the signal 46 from sawtooth generator 19, shall appear in the middle of signal 46, all of the received echoes are delayed by a small fixed amount, as indicated at 47 in Fig. 2. This delay may be obtained in any suitable manner, such as by means of an artificial delay line.

Figure 3:
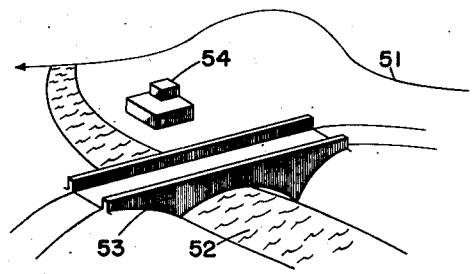
Fig. 3 illustrates a landscape over which the aircraft employing the device of the present invention is flying, the path of the aircraft thereover being indicated.
Figure 4:
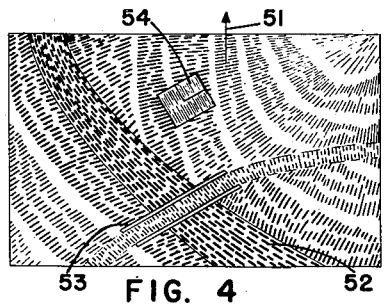
Fig. 4 illustrates the presentation of the landscape of Fig. 3 on the screen of the device of the present invention.

Fig. 4 illustrates a typical presentation on the screen of tube 23, according to the present invention, the terrain over which the aircraft was flying at the time the presentation was being obtained being shown in Fig. 3.

Referring now to Fig. 3, it is seen that the terrain over which the aircraft is flying, the flight path being indicated at 51, includes a river 52, a bridge 53 and a building 54. On the screen of tube 23, as shown in Fig. 4, river 52, which is farthest from the aircraft, appears the darkest, while building 54 appears the lightest. It is thus seen that the screen will exhibit a topographic presentation of the terrain being traversed, the various heights exhibiting various shades of gray and black.

The horizontal plate voltage obtained from the generator 25 attached to the antenna motor 24 is fed to the range controlled amplifier 26 and thence to the horizontal plates 27 and 28. The average height direct current bias from the integrator circuit 17 is also applied to the amplifier 26 in such a manner as to keep the scale on the scope constant, even though the mechanical sweep of the antenna, driven by motor 24, is approximately 30 degrees at all times.

The vertical sweep is provided by feeding the output of sweep generator 31 into vertical sweep amplifier 32. The output of amplifier 32 is connected across vertical deflection plates 33 and 34 of the cathode-ray tube 23. The slope of the output waveform of sweep generator 31 is regulated by an input voltage from the instrument panel, which is proportional to the plane speed, and is initially fed to a direct current amplifier to obtain sufficient voltage to bias the sweep generator. When the beam is deflected to the top of the scope, i. e. when the sawtooth voltage of amplifier 32 reaches a certain value, the beam is returned to the base by the firing of a gas tube in a conventional manner.

To cite a typical condition, assuming a plane speed of 200 feet per second at an altitude of 8,000 feet, the scope coverage will be approximately two miles square with a depth range of 50 to 400 feet.

The antenna should oscillate at about five cycles per second to achieve detail, and the transmitter pulse recurrent frequency should be 2,000 cycles per second or more, but not too high to limit the range of the radar device.

The invention described herein may be manufactured and used by or for the Government of the United States of America for governmental purposes without the payment of any royalties thereon or therefor.

What is claimed is:

1. An airborne object locating system comprising a source of pulse energy, a directional energy beam projector connected to said source, a first control mechanism moving said projector to scan a particular area, a cathode-ray tube having an indicating element and deflecting and intensity control elements operative to control the presentation on said indicating element, a second control mechanism connected between said first control mechanism and one pair of said deflecting control elements to operate said one pair of elements synchronously with the scanning motion of said projector, a third control mechanism adapted to be controlled by the speed of the aircraft, and connected to the other pair of deflecting elements, a receiver for receiving pulse echos from objects within the area scanned, a first linear sweep generator connected to said source and said receiver whereby the wave from the generator is started by a pulse from said source and stopped by the corresponding echo pulse, an integrator for integrating the output of said sweep generator, a multivibrator controlled by said integrator, a second linear sweep generator responsive to said multivibrator, means for combining the outputs of said second sweep generator and said receiver, and means connected between said combining means and said intensity control element for varying the intensity of the representations of the respective objects on said indicating element in accordance with their respective distances from the aircraft.

2. An airborne object locating system comprising a source of pulse energy, a directional energy beam projector connected to said source, a first control mechanism moving said projector to scan a particular area, a cathode-ray tube having an indicating element and deflecting and intensity control elements operative to control the presentation on said indicating element, a second control mechanism connected between said first control mechanism and one pair of said deflecting control elements to operate said one pair of elements synchronously with the scanning motion of said projector, a third control mechanism adapted to be controlled by the speed of the aircraft, and connected to the other pair of deflecting elements, a receiver for receiving pulse echoes from objects within the area scanned, means responsive to said source and said receiver for producing a voltage proportional to the average distance between the aircraft and the area scanned, a square wave generator having the duration of its cycle controlled by said voltage, a linear sweep generator responsive to said square wave generator, means for combining the outputs of said sweep generator and said receiver, and means connected between said combining means and said intensity control element for varying the intensity of the representations of the respective objects on said indicating element in accordance with their respective distances from the aircraft.

3. An airborne object locating system comprising a source of pulse energy, a directional energy beam projector connected to said source, a first control mechanism moving said projector to scan a particular area, a cathode-ray tube having an indicating element and deflecting and intensity control elements operative to control the presentation on said indicating element, a second control mechanism connected between said first control mechanism and one pair of said deflecting control elements for rendering said one pair of elements operable synchronously with the scanning motion of said projector, a third control mechanism adapted to be controlled by the speed of the aircraft, and connected to the other pair of deflecting elements, a receiver for receiving pulse echoes from objects within the area scanned, means responsive to said source and said receiver for producing a voltage proportional to the average distance between the aircraft and the area scanned, means responsive to said first named means for producing linear sweep signals each of whose triggering points is dependent upon said voltage, and means connected to said intensity control element for combining said signals and said echoes to vary the intensity of the representations of the respective objects on said indicating element in accordance with their respective distances from the aircraft.

4. A system according to claim 3 wherein said first named means is connected to said second control mechanism for maintaining the representation of the area scanned constant while the aircraft changes its distance from the area.

5. In an object locating system for an aircraft, said system comprising a source of pulse energy, scanning means connected to said source, a receiver of echo pulses for objects in the area scanned and an indicating device having deflecting and intensity control elements operative to control the representations on said device, one of said elements being provided with a range controlled amplifier, the combination comprising: means responsive to said energy source and said receiver and including a sawtooth generator and an integrator circuit for producing a voltage proportional to the average distance between the aircraft and the scanned area, said voltage producing means being operatively connected to said range controlled amplifier of the deflecting control elements as a bias therefor, means responsive to said voltage producing means for producing linear sweep signals each of whose triggering points is dependent upon the amplitude of said voltage, means for combining the linear sweep signals and the echo pulses to impose upon the intensity control element additional voltages proportional to the distances between the aircraft and the objects respectively, and a limiter connected between the receiver and said combining means, said combining means comprising a range gate to which said linear sweep signals producing means is connected and having an effective cutoff value substantially equal to the maximum value of the sweep signals.

WALTER J. HIRSCHBERG.
JEHUDA OVADIA.

REFERENCES CITED

The following references are of record in the file of this patent:

UNITED STATES PATENTS

| Number | Name | Date |
|---|---|---|
| 2,395,966 | Goldberg | Mar. 5, 1946 |
| 2,426,189 | Espenschied | Aug. 26, 1947 |
| 2,428,351 | Ayres | Oct. 7, 1947 |
| 2,508,358 | Ayres | May 23, 1950 |
| 2,509,007 | Mayer | May 23, 1950 |
| 2,517,752 | Wolff | Aug. 8, 1950 |